United States Patent
Johnson et al.

(10) Patent No.: US 11,286,801 B2
(45) Date of Patent: Mar. 29, 2022

(54) BOAS WITH TWIN AXIAL DOVETAIL

(71) Applicant: United Technologies Corporation, Farmington, CT (US)

(72) Inventors: Dean W. Johnson, Springvale, ME (US); Thomas E. Clark, Sanford, ME (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 507 days.

(21) Appl. No.: 16/158,397

(22) Filed: Oct. 12, 2018

(65) Prior Publication Data

US 2020/0116039 A1 Apr. 16, 2020

(51) Int. Cl.
*F01D 11/08* (2006.01)
*F01D 9/04* (2006.01)
*F01D 25/24* (2006.01)

(52) U.S. Cl.
CPC ............... *F01D 11/08* (2013.01); *F01D 9/04* (2013.01); *F01D 25/246* (2013.01)

(58) Field of Classification Search
CPC .............................. F01D 11/08; F01D 25/246
See application file for complete search history.

(56) References Cited

U.S. PATENT DOCUMENTS

| 6,514,041 | B1* | 2/2003 | Matheny ................. | F01D 11/18 |
| | | | | 415/177 |
| 7,052,235 | B2* | 5/2006 | Alford ..................... | F01D 9/04 |
| | | | | 415/173.1 |
| 7,819,625 | B2* | 10/2010 | Merrill .................. | F01D 11/122 |
| | | | | 415/170.1 |
| 9,458,726 | B2* | 10/2016 | Lamusga ................ | F01D 5/225 |
| 9,926,790 | B2* | 3/2018 | Landwehr ............. | F01D 11/005 |
| 2005/0271505 | A1 | 12/2005 | Alford | |
| 2006/0078429 | A1* | 4/2006 | Darkins, Jr. ............. | F01D 9/04 |
| | | | | 415/209.2 |
| 2010/0327535 | A1* | 12/2010 | Grace .................. | F16J 15/3288 |
| | | | | 277/355 |
| 2015/0308276 | A1 | 10/2015 | Kleinow | |

(Continued)

FOREIGN PATENT DOCUMENTS

| EP | 3103971 | 12/2016 |
| EP | 3255252 | 12/2017 |
| WO | 2015023576 | 2/2015 |

OTHER PUBLICATIONS

Extended European Search Report for Ep Application No. 19202228.3 dated Feb. 28, 2020.

*Primary Examiner* — Justin D Seabe
(74) *Attorney, Agent, or Firm* — Carlson, Gaskey & Olds, P.C.

(57) ABSTRACT

A turbine section for a gas turbine engine includes a turbine blade that extends radially outwardly to a radially outer tip and for rotation about an axis of rotation. A blade outer air seal has a plurality of segments arranged circumferentially about the axis of rotation and mounted in a support structure radially outward of the outer tip. Each of the segments have a radially inner surface and a radially outer surface and four hooks protruding radially outward from the radially outer surface and extending along the segment in an axial direction.

12 Claims, 7 Drawing Sheets

(56) References Cited

U.S. PATENT DOCUMENTS

2016/0201910 A1\* 7/2016 Chang ................... F23M 5/04
                                              60/753
2017/0145860 A1\* 5/2017 Shapiro ............... F04D 29/545
2018/0149029 A1\* 5/2018 Vetters ................ F01D 11/003

\* cited by examiner

BOAS WITH TWIN AXIAL DOVETAIL

BACKGROUND

This application relates to a blade outer air seal having axial dovetail attachments.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a turbine section for a gas turbine engine includes a turbine blade that extends radially outwardly to a radially outer tip and for rotation about an axis of rotation. A blade outer air seal has a plurality of segments arranged circumferentially about the axis of rotation and mounted in a support structure radially outward of the outer tip. Each of the segments have a radially inner surface and a radially outer surface and four hooks protruding radially outward from the radially outer surface and extending along the segment in an axial direction.

In a further embodiment of any of the above, the four hooks are circumferentially spaced from one another.

In a further embodiment of any of the above, two of the hooks extend generally in a first circumferential direction and two of the hooks extend generally in a second circumferential direction opposite the first circumferential direction.

In a further embodiment of any of the above, the four hooks form two generally dovetail shapes for engagement with the support structure.

In a further embodiment of any of the above, the support structure includes a plurality of circumferentially spaced protrusions that extend radially inward and are in engagement with the hooks.

In a further embodiment of any of the above, each of the circumferentially spaced protrusions has a first portion that extends in a first circumferential direction and a second portion that extends in a second circumferential direction opposite the first circumferential direction.

In a further embodiment of any of the above, the first portion is in engagement with a different hook than the second portion.

In a further embodiment of any of the above, the blade outer air seal includes a leading edge flange and a trailing edge flange.

In a further embodiment of any of the above, a wedge seal is arranged between each of the segments.

In a further embodiment of any of the above, the wedge seal is arranged between the blade outer air seal and the support structure.

In a further embodiment of any of the above, the blade outer air seal has a chamfer at a first circumferential end and a second circumferential end in engagement with the wedge seal.

In a further embodiment of any of the above, a number of blade outer air seal segments is equal to a number of wedge seals.

In a further embodiment of any of the above, a spring clip is arranged between the blade outer air seal and the support structure.

In a further embodiment of any of the above, a number of blade outer air seal segments is equal to a number of spring clips.

In a further embodiment of any of the above, a brush seal is in engagement with the blade outer air seal and the support structure.

In a further embodiment of any of the above, the blade outer air seal is a ceramic matrix composite material.

In a further embodiment of any of the above, the support structure is a metallic material.

In another exemplary embodiment, a method of manufacturing a blade outer air seal includes forming a platform that extends from a leading edge to a trailing edge and a plurality of hooks by laying a plurality of layers of fibrous woven structure. A leading edge flange in the platform at the leading edge is machined and a trailing edge flange in the platform at the trailing edge.

In a further embodiment of any of the above, the fibrous woven structure includes silicon carbide fibers.

In a further embodiment of any of the above, the machining comprises ultrasonic machining.

These and other features may be best understood from the following drawings and specification.

DETAILED DESCRIPTION

Figure 1:
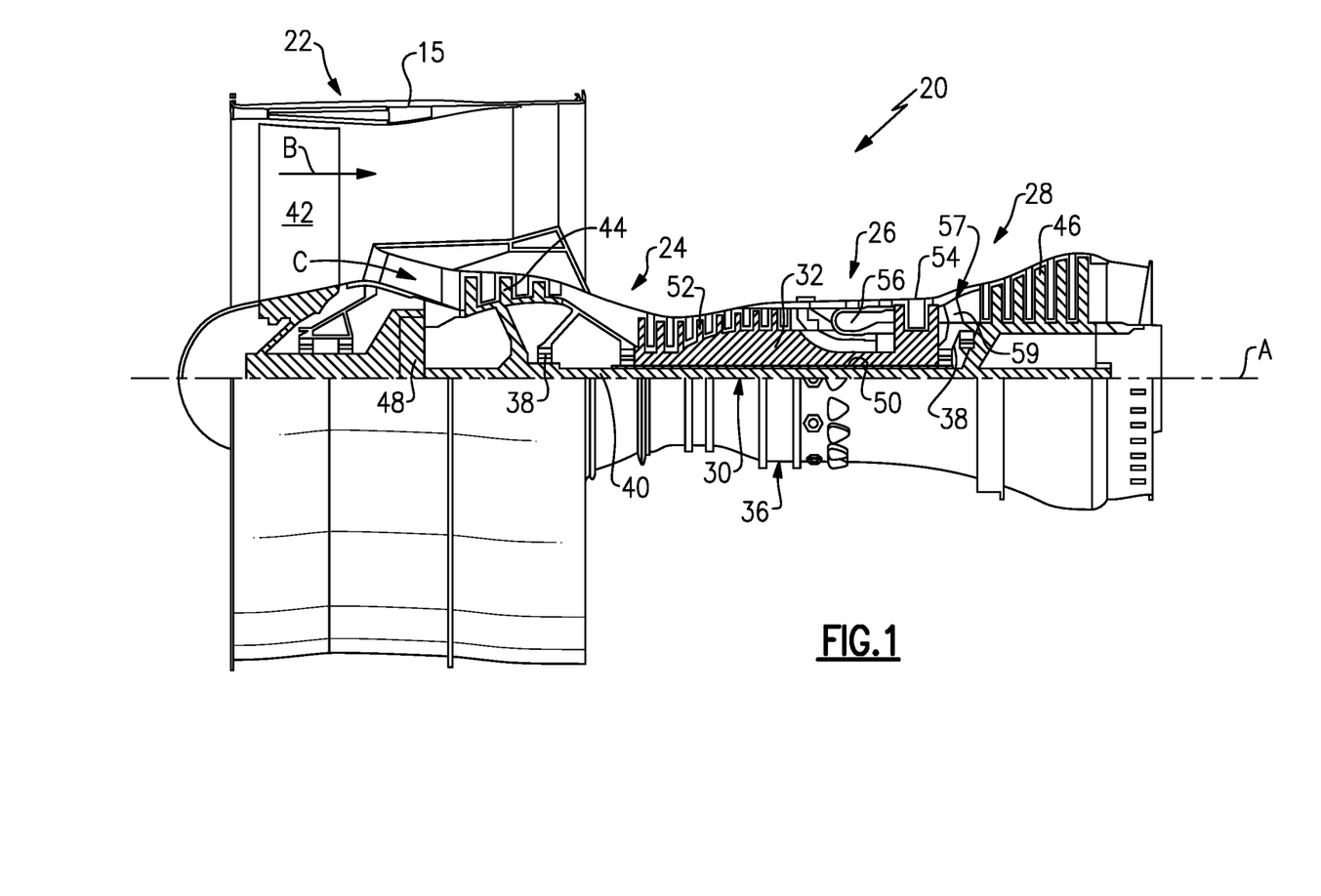
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
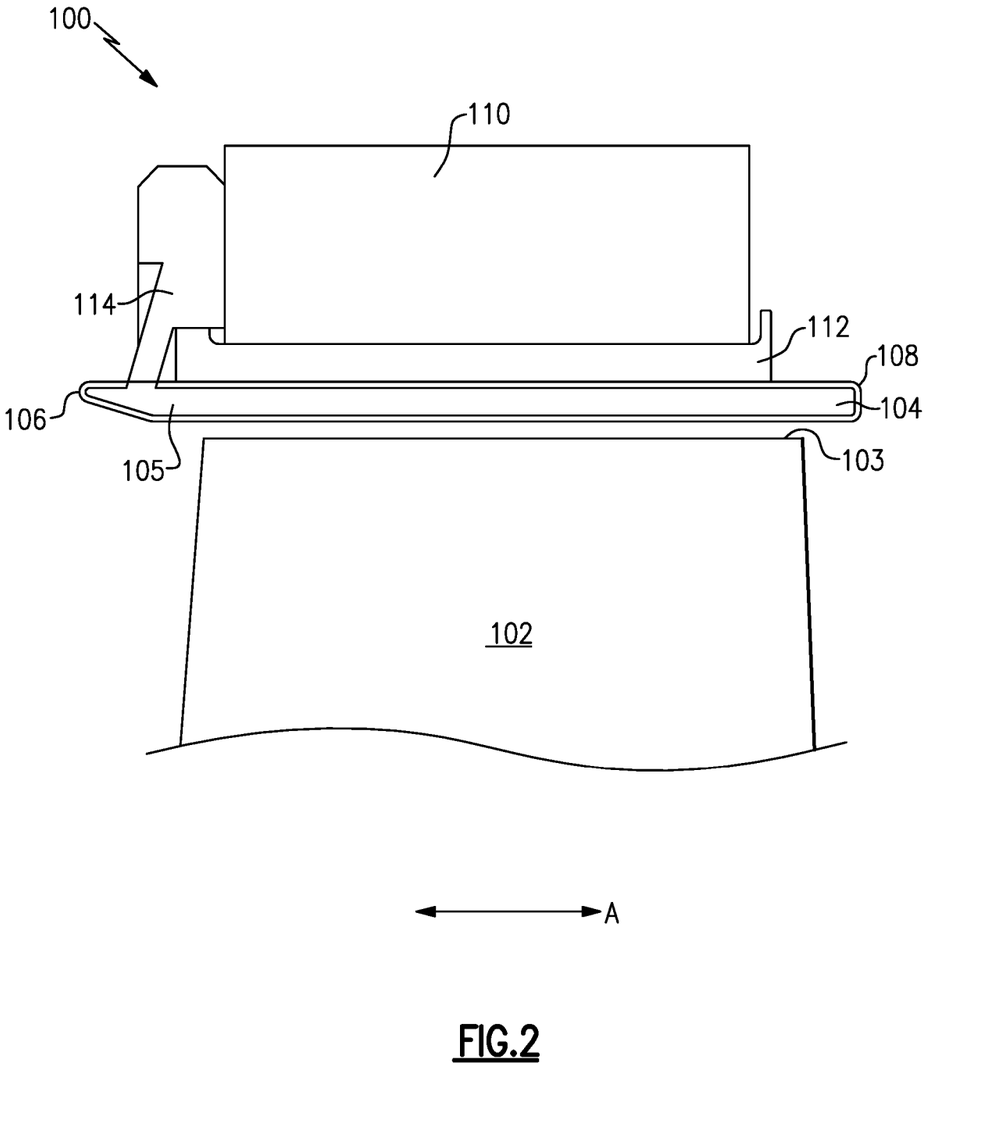
FIG. 2 shows a portion of a turbine section.

FIG. 2 shows a cross section of a portion of a turbine section 100, which may be incorporated into a gas turbine engine such as the one shown in FIG. 1. However, it should be understood that the turbine section 100 could be utilized in other gas turbine engines, and even gas turbine engines not having a fan section at all.

A turbine blade 102 has a radially outer tip 103 that is spaced from a blade outer air seal ("BOAS") 104. The BOAS 104 may be made up of a plurality of seal segments 105 that are circumferentially arranged in an annulus about the central axis A of the engine 20. The BOAS 104 has a leading edge 106 and a trailing edge 108. The BOAS seal segments 105 may be monolithic bodies that are formed of a high thermal-resistance, low-toughness material, such as a ceramic matrix composite ("CMC"). In another embodiment, the seal segments 105 may be formed from another material, such as monolithic ceramic or a metallic alloy. In one example, the seal segments 105 are a cobalt alloy.

The BOAS 104 is mounted to a BOAS support structure 110. The support structure 110 may be mounted to an engine structure, such as engine static structure 36 (FIG. 1). The support structure may be a unitary ring structure, in some examples. In some embodiments, a wedge seal 112 may be arranged between seal segments 105. A radial seal, such as brush seal 114 may be arranged over the wedge seal 112. The wedge seal 112 terminates in close proximity to the brush seal 114. The brush seal 114 may be a full ring brush seal, for example. The brush seal 114 is seated over the wedge seal 112 to hold the BOAS 104 into the support structure 110. The brush seal 114 may further provide a sealing surface. In an example, the brush seal 114 is a cobalt or nickel alloy. The brush seal 114 entraps the assembly to provide sealing of inter-part gaps between dovetail regions.

Figure 3:
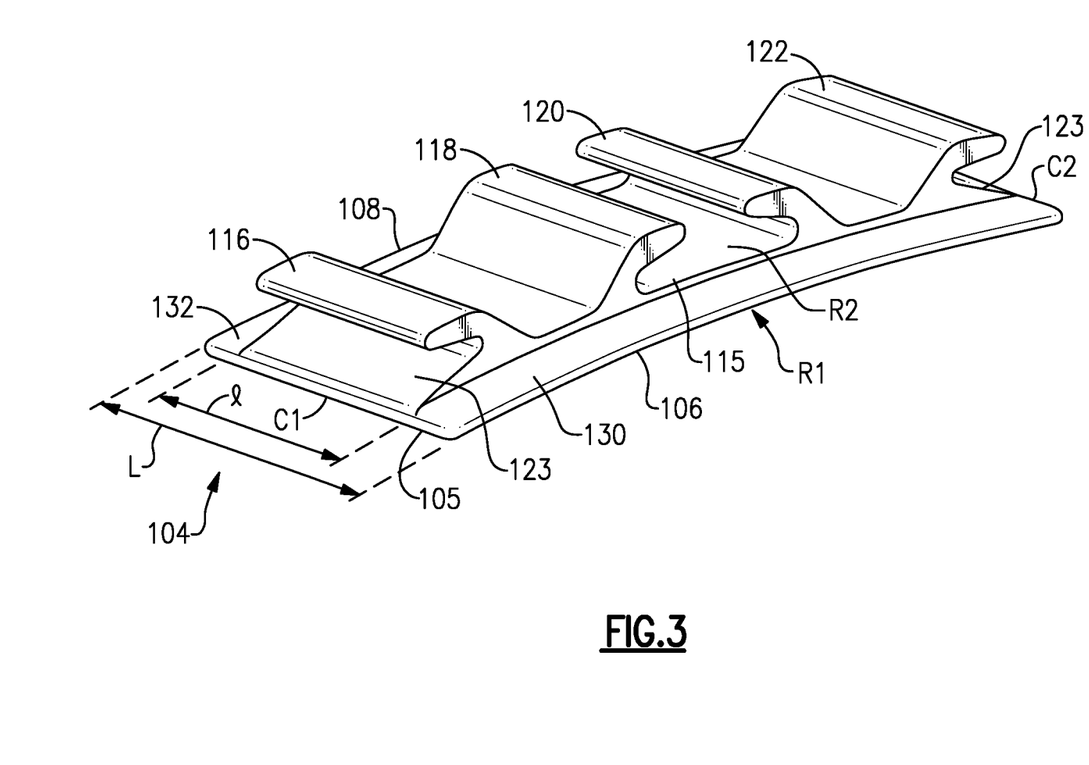
FIG. 3 shows an exemplary blade outer air seal.

FIG. 3 shows an exemplary BOAS seal segment 105. Each seal segment 105 has a platform 115 that defines radially inner and outer sides R1, R2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The leading edge 106 faces in a forward direction toward the front of the engine 20 (i.e., toward the fan 42), and the trailing edge 108 faces in an aft direction toward the rear of the engine 20 (i.e., toward the exhaust end).

The BOAS 104 has a plurality of hooks 116, 118, 120, 122 extending from the radially outer side R2. The hooks 116, 118, 120, 122 extend in a radially outer direction. Each of the hooks 116, 118, 120, 122 extends in the circumferential direction. The hooks 116, 118, 120, 122 are arranged in two pairs that each form a dovetail shape. The hooks 116, 118 hook in opposite directions to form a first dovetail shape. The hooks 120, 122 hook in opposite directions to form a second dovetail shape. In other words, the hooks alternate in direction. Hooks 116, 120 curve in a direction towards the first circumferential side C1, while hooks 118, 122 curve in a direction towards the second circumferential side C2. Between the hooks 116, 118, 120, 122, the radially outer surface R2 is generally flat. The radially outer surface R2 slopes circumferentially outward of the hooks 116, 122.

The two center hooks 118, 120 prevent rotation, eliminating the need for additional retention hardware and improving circumferential BOAS positioning within the engine. This improved circumferential positioning may help prevent thermal lockup.

A flange 130 extends axially forward at the leading edge 106. A flange 132 extends axially aft at the trailing edge 108. An axial length L extends from the leading edge 106 to the trailing edge 108. An axial length of a dovetail portion extends a length l, which is smaller than the axial length L. The dovetail portion is the axial length of the hooks 116, 118, 120, 122. In an embodiment, all of the hooks 116, 118, 120, 122 have the same axial length. In one example, a ratio of the axial length L to the dovetail length l is less than 2:1. In a further example, a ratio of the axial length L to the dovetail length l is between 2:1 and 1.1:1.

The BOAS 104 may include a chamfered portion 123 at the first and second circumferential sides C1, C2. This chamfered portion 123 provides an engagement surface for intersegment sealing.

Figure 4:
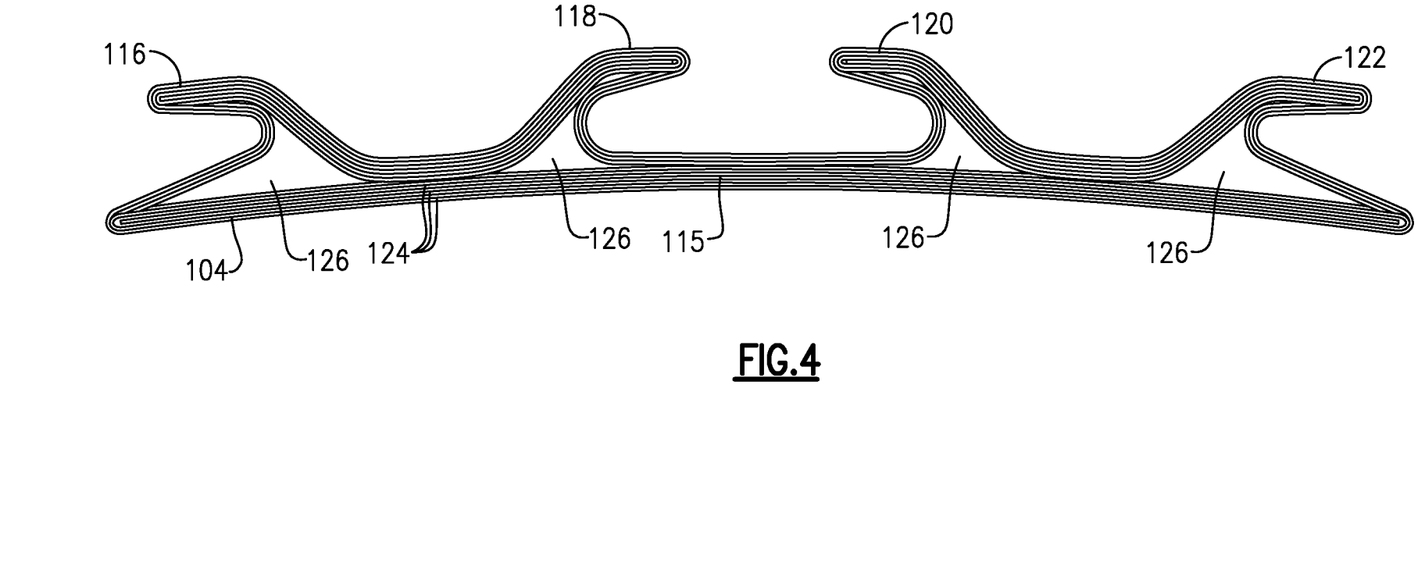
FIG. 4 is a cross-sectional view through a blade outer air seal.

FIG. 4 shows a cross sectional view of the BOAS 104. In this embodiment, the BOAS 104 is formed of a ceramic matrix composite ("CMC") material. The BOAS 104 is formed of a plurality of CMC laminate plies 124. In some embodiments, a noodle region 126 may be formed at the base of each of the hooks 116, 118, 120, 122. The noodle region 126 does not include laminate plies 124 because of the shape of the platform 115 and hooks 116, 118, 120, 122. In some embodiments, the noodle region 126 may be filled with a fiber matrix or loose fiber. The laminates may be silicon carbide fibers, formed into a woven fabric in each layer. The fibers may be coated by a boron nitride.

In some embodiments it may be desirable to add additional material to make the laminates 124 more stiff than their free woven fiber state. Thus, a process known as densification may be utilized to increase the density of the laminate material after assembly. Densification includes injecting material, such as a silicon carbide matrix material, into spaces between the fibers in the laminate plies 124. This may be utilized to provide 100% of the desired densification, or only some percentage. One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% densification may be difficult to achieve.

Figure 5A:
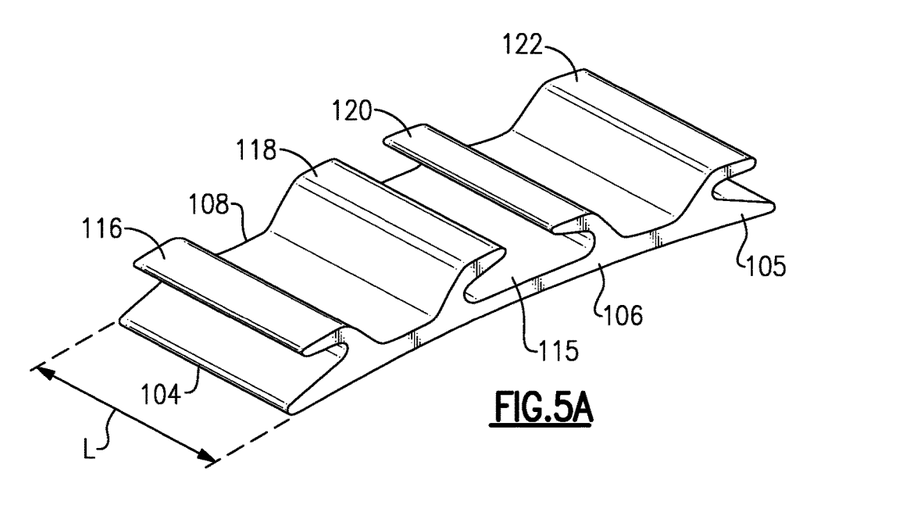
FIG. 5A shows a step in a manufacturing method for a blade outer air seal.
Figure 5B:
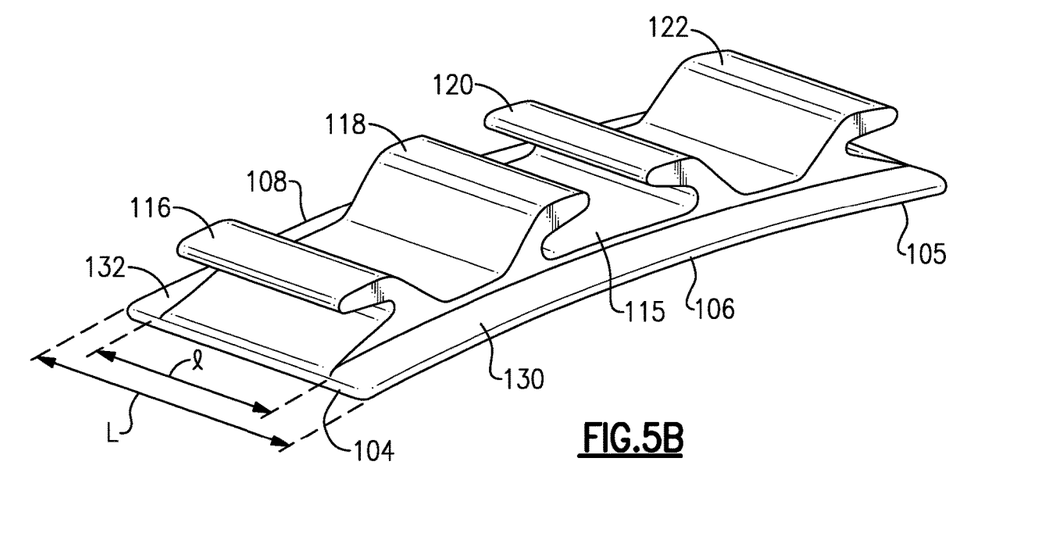
FIG. 5B shows a subsequent step in a manufacturing method for a blade outer air seal.

FIGS. 5A and 5B show manufacturing steps to form the BOAS 104. As shown in FIG. 5A, laminated CMC plies are used to form the platform 115 and hooks 116, 118, 120, 122. In an example embodiment, the BOAS 104 includes two dimensional braided overwrap plies. In another example embodiment, the platform 115 is an 8HS platform, and the hook plies are two dimensional braided overwrap plies. In some embodiments, laminate layers are arranged over a laminate preform to form the platform 115 and hooks 116, 118, 120, 122. At this stage of manufacturing, the hooks 116, 118, 120, 122 have the axial length L.

The BOAS 104 of FIG. 5A is then machined to form the flange 130 protruding axially outward at the leading edge 106 and the flange 132 protruding axially outward at the trailing edge 108, as shown in FIG. 5B. The BOAS 104 may be machined using ultrasonic machining, for example. Ultrasonic machining produces close-tolerances on the flanges 130, 132, to provide a seal land along the leading and trailing edges 106, 108. However, it should be understood that other manufacturing techniques may be utilized to form the completed BOAS 104. After this machining step, the hooks 116, 118, 120, 122 have the dovetail portion length l, which is smaller than the axial length L from the leading edge 106 to the trailing edge 108.

Figure 6A:
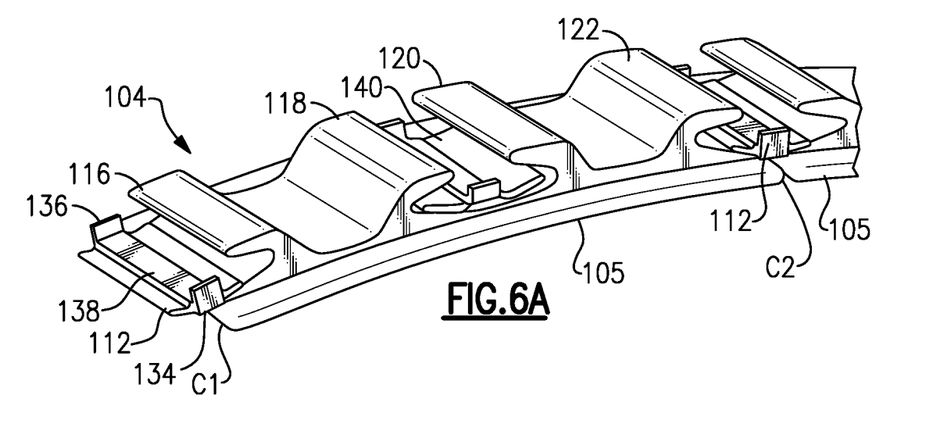
FIG. 6A shows an exemplary blade outer air seal assembly.

FIGS. 6A-6D show a BOAS assembly having a plurality of BOAS seal segments 105 arranged circumferentially. As shown in FIG. 6A, a wedge seal 112 is arranged at each circumferential end C1, C2 of a seal segment 105. That is, a wedge seal 112 is arranged between each of the seal segments 105. The wedge seal 112 includes locating features 134, 136 at the leading and trailing edges 106, 108, respectively. The wedge seal 112 may include ribs 138 to engage with the BOAS support structure 110. A spring clip 140 is arranged between the hooks 118, 120. The wedge seal 112 and spring clip 140 are utilized to position the BOAS 104 and provide BOAS 104 mateface sealing. In an embodiment, the wedge seal 112 and spring clip 140 are formed from a cobalt alloy.

Figure 6B:
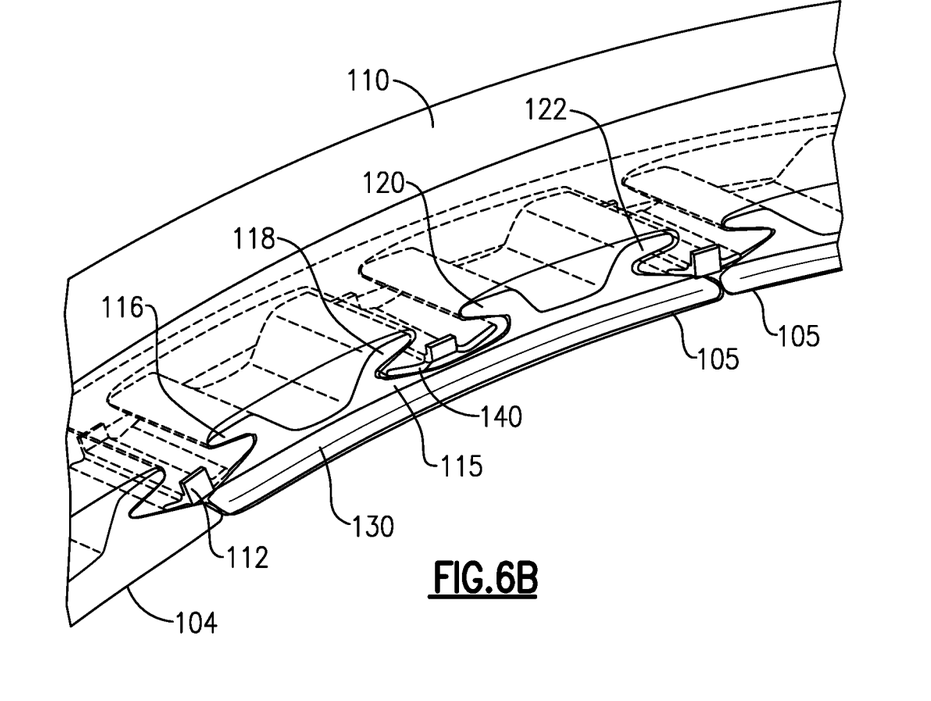
FIG. 6B shows an exemplary blade outer air seal assembly.
Figure 6C:
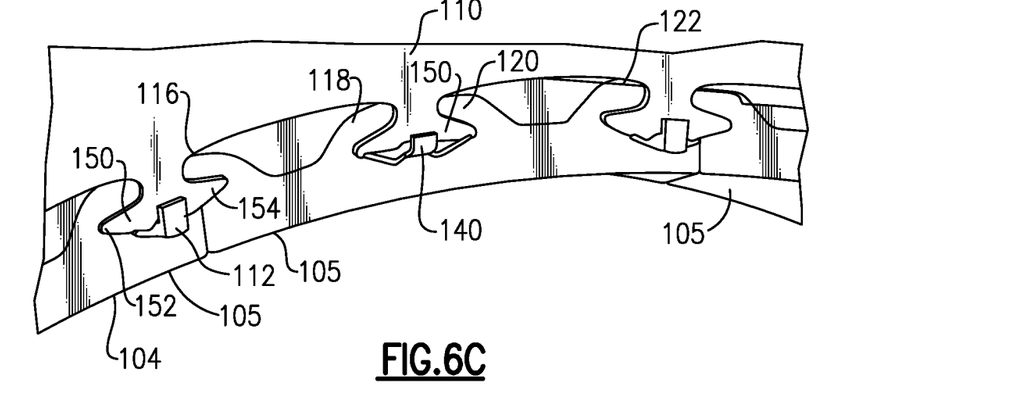
FIG. 6C shows an exemplary blade outer air seal assembly.
Figure 6D:
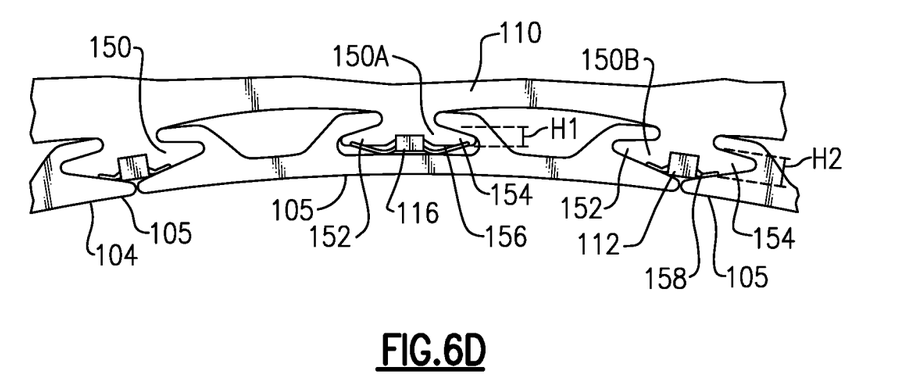
FIG. 6D shows an exemplary blade outer air seal assembly.

As shown in FIGS. 6B-6D, the BOAS 104, wedge seal 112, and spring clip 140 are positioned radially inward of the support structure 110 and are in engagement with the support structure 110. The wedge seal 112 and spring clip 140 are trapped once the BOAS 104 is installed into the support structure 110. The spring clip 140 seats the BOAS hooks 116, 118, 120, 122 into the support structure 110 during assembly, and at low-power operating conditions. In an embodiment, the wedge seal 112 and spring clip 140 are in engagement with the flanges 130, 132. In a further embodiment, the locating features 134, 136 are axially inward of the leading and trailing edges 106, 108, and contact the flanges 130, 132. Although a wedge seal 112 is illustrated, other types of intersegment seals may be utilized with the disclosed BOAS 104.

The wedge seal 112 is thicker and more resilient than the spring clip 140, while the spring clip 140 is thinner and more compliant. The wedge seal 112 and spring clip 140 may be loaded radially. In the illustrated embodiment, wedge seals 112 and spring clips 140 alternate around the circumferential support structure 110. In another embodiment, wedge seal 112 is used all the way around without spring clips 140 or spring clip 140 is used without wedge seals 112. In an example, there are the same number of seal segments 105 as wedge seals 112 and spring clips 140 arranged circumferentially about the axis of rotation A.

As shown in FIGS. 6C-6D, the support structure 110 includes a plurality of protrusions 150 that extend radially inward for engagement with the hooks 116, 118, 120, 122. Each protrusion has a first portion 152 extending in a first circumferential direction, and a second portion 154 extending an opposing second circumferential direction. The first and second portions 154 of a single protrusion 150 engage two different hooks of the BOAS 104. For example, the first portion 152 may engage the hook 118, while the second portion engages the hook 120. In another example, the first portion 152 may engage the hook 122 while the second portion 154 engages the hook 116 of a neighboring seal segment 105. In some embodiments, the protrusions 150 have different shapes. For example, a protrusion 150A may have a height $H_1$ from where the first and second portions 152, 154 begin to a radially innermost point 156. Another protrusion 150B may have a height $H_2$ from where the first and second portions 152, 154 begin to a radially innermost point 158. In the illustrated embodiment, the height $H_1$ is smaller than the height $H_2$. These differing protrusions 150A, 150B are configured to accommodate the differing shapes of the wedge seals 112 and spring clips 140. The two protrusion shapes 150A, 150B alternate about the circumferential support structure 110. The two protrusion shapes 150A, 150B ensure BOAS seal segments 105, wedge seals 112, and spring clips 140 are installed in the correct spots, and prevent them from being shifted over.

The axially extending hooks 116, 118, 120, 122 provide for axial assembly of the BOAS 104 into the support structure 110. The BOAS seal segments 105 may be individually removed or installed.

Known BOAS use two hooks for attachment to the support structure. The disclosed BOAS 104 having four hooks 116, 118, 120, 122 double the contact area with the support structure 110, which helps distribute contact stresses on the BOAS 104. The four hooks also improves the failure mode, as the BOAS seal segment 105 remains secured to the support structure 110 when a hook fails. The four hook BOAS also requires fewer seal segments around the support structure 110 than a two hook BOAS.

In this disclosure, "generally circumferentially" means having a direction having a vector component in the circumferential direction that is greater than a vector component in the radial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A turbine section for a gas turbine engine, comprising:
a turbine blade extending radially outwardly to a radially outer tip and for rotation about an axis of rotation;
a blade outer air seal having a plurality of segments arranged circumferentially about the axis of rotation and mounted in a support structure radially outward of the outer tip, each of the segments having a radially inner surface and a radially outer surface and four hooks protruding radially outward from the radially outer surface and extending along the segment in an axial direction, wherein the four hooks are circumferentially spaced from one another and wherein two of the hooks extend generally in a first circumferential direction, and two of the hooks extend generally in a second circumferential direction opposite the first circumferential direction, wherein each of the four hooks has a same position in the axial direction, and wherein the blade outer air seal is a ceramic matrix composite material;
a wedge seal arranged between each of the segments between the blade outer air seal and the support structure, and wherein a spring clip is arranged between the blade outer air seal and the support structure, the spring clip arranged between two of the four circumferentially spaced hooks on one of the plurality of segments.

2. The turbine section of claim 1, wherein the four hooks form two generally dovetail shapes for engagement with the support structure.

3. The turbine section of claim 1, wherein the support structure includes a plurality of circumferentially spaced protrusions extending radially inward, and in engagement with the hooks.

4. The turbine section of claim 3, wherein each of the circumferentially spaced protrusions has a first portion extending in the first circumferential direction and a second portion extending in the second circumferential direction opposite the first circumferential direction.

5. The turbine section of claim 4, wherein the first portion is in engagement with a different hook than the second portion.

6. The turbine section of claim 1, wherein the blade outer air seal includes a leading edge flange and a trailing edge flange.

7. The turbine section of claim 1, wherein the blade outer air seal has a chamfer at a first circumferential end and a second circumferential end in engagement with the wedge seal.

8. The turbine section of claim 1, wherein a number of blade outer air seal segments is equal to a number of wedge seals.

9. The turbine section of claim 1, wherein a number of blade outer air seal segments is equal to a number of spring clips.

10. The turbine section of claim 1, wherein a brush seal is in engagement with the blade outer air seal and the support structure.

11. The turbine section of claim 1, wherein the support structure is a metallic material.

12. The turbine section of claim 1, wherein the radially outer surface has a first length in the axial direction and the four hooks have a second length in the axial direction, and a ratio of the first length to the second length is between 1.1 and 2.

\* \* \* \* \*